Figure 1:
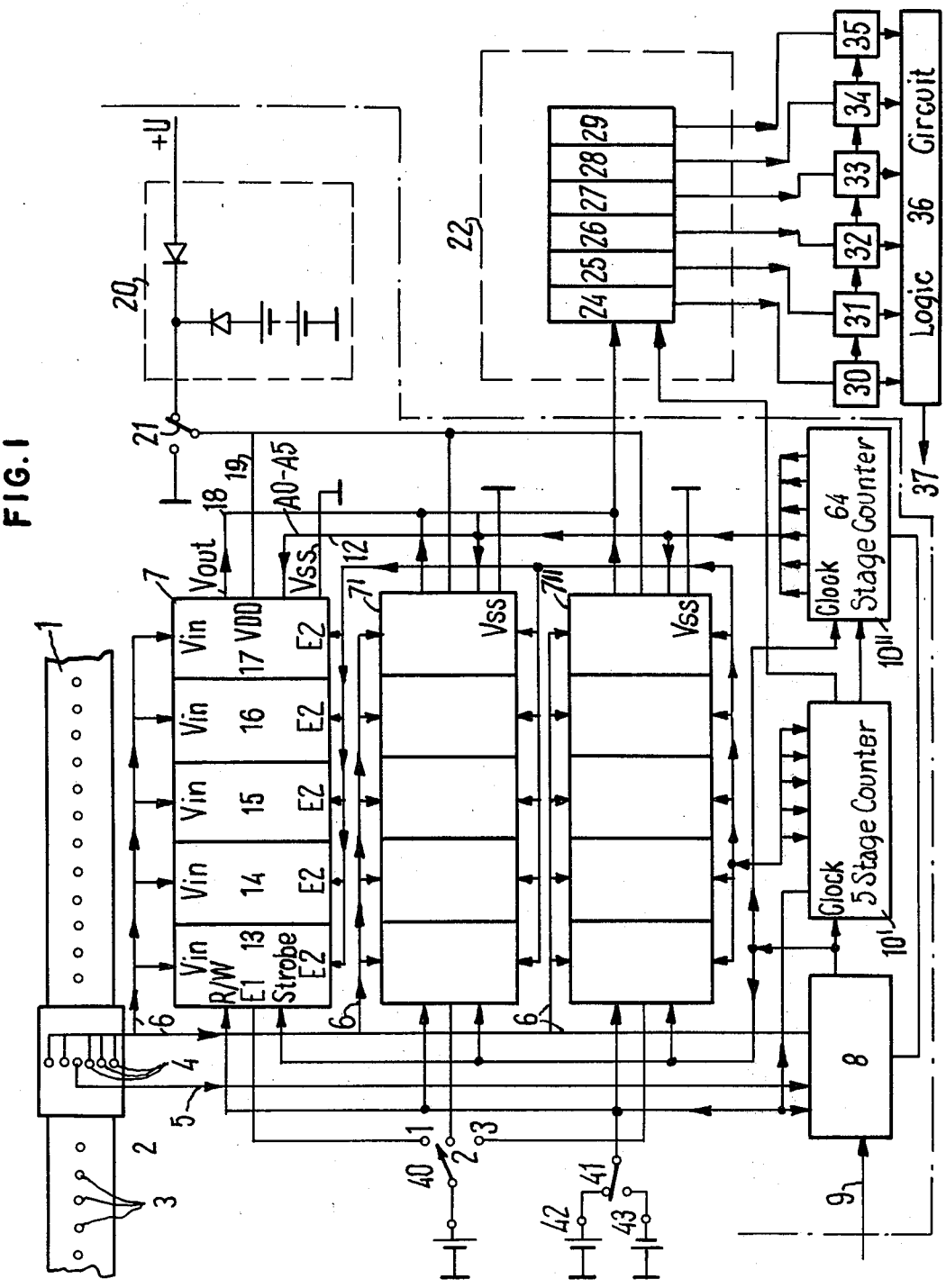

United States Patent [19]

Kreil et al.

[11] 4,163,870
[45] Aug. 7, 1979

[54] CIRCUIT FOR PRODUCING A PULSE SUCCESSION

[75] Inventors: Siegmund Kreil, Stockdorf; Achim Zech, Weidach; Reinhard Hergert, Neuried, all of Fed. Rep. of Germany

[73] Assignee: Siemens Aktiengesellschaft, Berlin & Munich, Fed. Rep. of Germany

[21] Appl. No.: 293,664

[22] Filed: Sep. 22, 1972
(Under 37 CFR 1.47)

[30] Foreign Application Priority Data

Nov. 15, 1971 [DE] Fed. Rep. of Germany ....... 2156635

[51] Int. Cl.² ............................................. H04L 17/02
[52] U.S. Cl. .................................... 178/26 R; 178/79;
178/22
[58] Field of Search ............... 178/79, 26 R; 340/345, 340/348, 353

[56] References Cited

U.S. PATENT DOCUMENTS

| 3,162,725 | 12/1964 | Oleson | 178/79 |
| 3,307,174 | 2/1967 | Kunikowski | 340/345 |
| 3,361,875 | 1/1968 | Banfalvi et al. | 178/79 |
| 3,396,238 | 8/1968 | Davy et al. | 178/79 |

Primary Examiner—Howard A. Birmiel
Attorney, Agent, or Firm—Hill, Van Santen, Steadman, Chiara & Simpson

[57] ABSTRACT

A circuit for producing a pulse succession of long duration from several mutually independently produced synchronous pulse successions of shorter duration in which the output signal is derived as a logical function. Each of the pulse successions of shorter duration is produced by a separate generator and the pulse succession program of each of the generators is determined by a common information carrier, in particular a punched strip. A memory is interposed to take the information which is emitted separately by the information carrier for each of the generators and controls the respective generator. A sensing device is provided for the information carrier to respectively evaluate a portion of the information contained therein, the sensing device being connected to a series-parallel converter having storage facilities for the parallel result to effect adjustment of the individual generators. The information carrier and the sensing device are movable with respect to each other over the entire length of the memory in order to adjust the parallel storage.

10 Claims, 2 Drawing Figures

CIRCUIT FOR PRODUCING A PULSE SUCCESSION

DESCRIPTION

This invention relates to a circuit for producing a pulse succession of longer duration from several mutually independently produced, but synchronous, pulse successions of shorter duration. The output signal is derived as a logical function, whereby each of the pulse successions of shorter duration is produced in a special generator and the pulse succession program of each of the generators is determined by a common information carrier, particularly a punched tape, while a memory for receiving the information individually provided by the carrier for each of the generators is employed for controlling the respective generators.

The object of the invention is to simplify the evaluation of the information carried by the common information carrier with respect to the adjustment of the pulse succession programs of the individual generators. Furthermore, this invention is based on the task of entirely avoiding the direct evaluation of the information carried by the information carrier in an individual coding device.

The first-mentioned object is achieved, according to this invention, by the provision of a circuit of the type initially described wherein a scanning or sensing device is provided for the common information carrier to respectively evaluate portions of the information contained therein and a series-parallel converter having a storage facility for the parallel result thereof is connected to the sensing device to effect adjustment of the individual generators. The entire information carrier and the sensing device are constructed so as to be movable with respect to each other over the entire length of the information memory in order to adjust the parallel storage.

It is advantageous when the operational memory is distributed with respect to the individual generators and, in particular, firmly associated therewith. Furthermore, it is advantageous to embody the series-parallel converter as an intermediate memory. In applications where it is important to provide several pulse succession programs selectively, for changing the code, it will be advantageous to effect such a selection whereby several series-parallel converters each having storage facilities are provided which can be successfully connected to the sensing device, and that furthermore a switching device be provided which respectively allows connection of one of the series-parallel converters and its storage facility to the operational memory.

In order to secure the entire coding device from an unauthorized transfer of the pulse succession programs, if the device is possibly lost, for example, it is furthermore advisable that a switching device be provided for effecting instantaneous erasure of the stored parallel information.

It is further advantageous if the storage facility for the parallel storage of information has a long storage time which is guaranteed in the event of a power failure. In a further development of the invention, the second-mentioned object is advantageously achieved by the provision of the sensing device with its series-parallel converter having a storage facility as a separate component group. The separate component group is provided for the adjustment of the code generators of several, preferably locally separated, code devices, and the parallel output is provided as an output of the separate unit which is associated with a corresponding input of the individual code device. Further, the output timing succession is determined either by a timing pulse generator associated with the unit, or by the timing pulse generator of the individual code generator.

Figure 2:
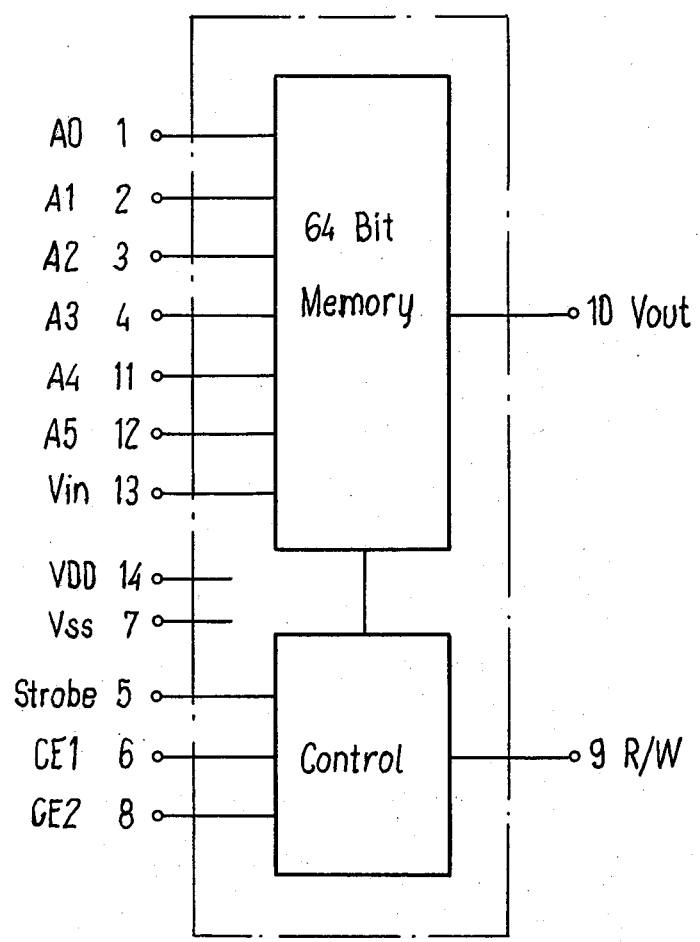

Other objects, features and advantages of the invention, its organization, construction and operation will be best understood from the following detailed description of a preferred embodiment thereof taken in conjunction with the accompanying drawings, on which:

FIG. 1 is a logic circuit diagram illustrating an embodiment of the code generator adjustment techniques according to the present invention; and FIG. 2 is a block diagram for an individual memory section of the intermediate memories illustrated in FIG. 1.

Referring to FIG. 1, a conventional punched tape carries five punch tracks 4 for storing the individual types of information. Here, conventional is employed to mean the provision of a transporting track in addition to the five information tracks. The transporting track comprises a continuous line of holes 3. The holes 4 of the information track, as is generally known, are firmly associated with the transporting track. A guidance device, which is simultaneously a sensing device 2 is provided for the punched tape and is designed in such a way that only movement of the tape in one direction within the guide is permitted, for example from right to left with respect to the drawing. The evaluation for the hole distribution in the strip 1, which is provided according to program, is effected with the help of contacts within the guide 2 which, dependent on whether an information hole is present or not, are opened or closed. In the place of mechanical contacts, preferably opto-electronic sensing devices such as correspondingly arranged light sources with optical receiving members may be provided. These devices may be, for example, photo cells, photo transistors and the like, and are positioned accordingly with respect to the spacing of the information tracks. Such a transfer of information is provided not only for the information track, but also for the transporting track 3. The reason for this is provided in the fact that the transporting track illustrated in the sample embodiment, since it is punched continuously, may also advantageously be employed as a timing pulse derivation track. The five information lines which come from the sensing guide 2 and which have been illustrated as a single bundle of lines 6 in the drawing, are extended to an intermediate memory 7. The intermediate memory 7 includes the same number of separate memory sections as lines extended thereto. For example, the receiving line for the uppermost information track is extended to the memory section 13, the next-lower line is extended to the memory section 14, and the further information lines correspondingly extend to the memory sections 15, 16 and 17. The individual memory sections 13 through 17 have a storage capacity of as many bits as the maximum number of information digits to be emitted in a series code to be evaluated from the punched tape 1. In other words, each individual storage section of a punched tape comprising, for example, 64 transport holes 3 has, for example, a storage capacity of 64 bits in the storage section 13.

The pulse succession derived from the holes 3 of the transporting track when the punched strip 1 is moved is supplied to a timing circuit 8 for deriving timing pulses.

The timing circuit 8 feeds a first counter 10' and a second counter 10". The first counter 10' is only required for reading and is therefore not further described at this time. The second counter 10" serves for the derivation of the continuous switching pulse succession for each individual one of the storage sections 13–17. Therefore, the counter 10' illustrated in the sample embodiment of FIG. 1 emits 64 continuous switching pulses, wherein one pulse is respectively released when a corresponding triggering pulse is emitted in response to sensing of one of the holes 3 of the transporting track of the punched tape 1. The 64 continuous switching pulses are provided in the sample embodiment since, as mentioned above, it is assumed that the punched tape 1 may contain information in a quinary parallel code at 64 successive positions. Therefore, movement of the punched tape 1 through the sensing device 2, 4 causes a successive writing of the information of the punched strip 1 into the intermediate memory 7, more particularly into the storage sections 13–17. It is assumed that the intermediate memory 7 stores the information for a correspondingly long duration and stores a repeated reading without erasure. Due to this, storage circuits which operate in accordance with the so-called complementary MOS logic techniques have proven to be advantageous for the storage sections 13–17 of the memory 7. This type of storage, which is well known in itself, has a very low power requirement. Furthermore, storage for practically any length of time may be had if care is taken that the current supply of the individual storage sections does not fail. This can be provided by connecting a corresponding energy storer which becomes effective for providing power should the external correct sources fail. A circuit for providing this feature is illustrated in FIG. 1 in the form of the current supply circuit 20. The circuit 20 includes a first diode which extends from a feed line referenced +U, representing an external operational voltage source, to a switch 21 which is connected with a charge storage device, such as a capacitor or a battery, by way of a second diode. If a capacitor is used, many applications have indicated that a value of several 100 μF has proven to provide a sufficiently high capacitance value and storage ability. The operational voltage supply, indicated by the line 19, of the intermediate memory 7 is connected to the switch 21.

In order to guarantee an immediate erasure of the intermediate memory 7 during an unauthorized access, which must be taken into account, the operational voltage connection 19 can also be grounded directly by way of the switch 21. In this manner, the operational voltage line 19 will be rendered free from potential and the contents of the memory will be erased and no longer identifiable.

The information stored in the parallel code in the storage sections 13–17, which was derived from the five information tracks of the punched tape 1, are available for reading at the outputs Vout of the individual sections in parallel form. The inputs of the individual storage sections 13–17 have been referenced Vin.

A plurality of code generators 30–35 provide the individual pulse programs. Since a series code is required for adjusting the generators 30–35, a reading of the storage sections 13–17 is to be effected in such a manner that, first of all, the first storage location is called by the memory section 13, then the first storage section is called by the memory section 14, etc, as far as the storage section 17. Then, the second storage location is called by the storage section 13, the second storage location by the storage section 14, etc, until all 64 storage locations of each of the storage sections 13–17 have been called. In order to obtain this serially oriented reading, the aforementioned counter 10' is provided which switches from one activating line to the next in response to the receipt of a respective timing pulse from the timing circuit 8 and causes the reading process. The read timing pulse succession is derived in the timing circuit 8 from a read timing pulse succession 9 which is supplied to the code device itself or to the code device by way of its timing center.

The activating lines, which are those lines which activate the reading process in the individual storage sections 13–17, have been referenced E2. Accordingly, an output pulse succession in the form of a pure series code will be available at the output of the intermediate memory 7, at the collecting line 18 which is connected to the respective outputs Vout. This pulse succession is then supplied to an operational memory 22.

It is also possible, in place of the just described reading operation, to first of all fully read out the first intermediate storage section 13, step-by-step, to obtain the 64 bits stored therein, and only then read the next storage section 14, etc, to the intermediate storage section 17. In this manner, a pure series code will also be obtained. The particular technique employed depends on the organization of the code program to be utilized in an individual application.

The series code read from the memory 7 will be, as mentioned above, stored in the operational memory 22 which includes as many storage sections as information bits of the series code. In this particular example storage for the number 320 bits would be required. Certain storage locations in the operational memory 22, which have been referenced with the numerals 24–29 in this embodiment, are respectively associated with certain ones of the code generators 30–35. Six such generators have been illustrated for this example. The timing pulse lines associated with these generators and extending from the timing center of the code device itself have not been illustrated in detail in order to provide a better overall view and simplify matters. In the same manner, the output pulse successions of the generators 30–35 are combined, with the help of a logic circuit 36, to provide the output code succession and have only been schematically illustrated.

The activation of the memory 7 for writing information from the punched tape 1 into the intermediate memory 7 is effected in such a way that the write potential of an operational current source 42 is applied to the read/write line R/W of the memory 7 by way of a switch 41. When the information has been written into the memory 7, a further writing is provided in such a way that a blocking potential is provided. This blocking potential may be derived from a battery 43 and applied to the read/write line R/W by way of the switch 41. In the blocked state of the memory 7, one can read directly from the respective storage sections 13–17 by way of the outputs Vout or the collecting line 18, respectively, by the application of activating potentials to the input connections E2.

Further, in the sample embodiment of the invention illustrated in FIG. 1, several intermediate memories 7, 7' and 7" are provided. Each of these intermediate memories can be correspondingly activated with the help of a selection switch 40, by way of a respective connection E1 which affects all of the storage sections of the respective memory. The effect of the application of an activating potential to the connection E1 is that reading or writing cannot be accomplished when the potential is missing from the connection E1. Therefore, it is possible to program, for example, the memory 7 with the help of a first punched tape, and then to program the memory 7' with the help of a second punched tape, and then program the memory 7" with the help of a third punched tape. In this manner, it is later a simple task for operating personel to carry out a code change merely by means of switching the switch 40 into one of the indicated switching positions. For this purpose, each of the intermediate memories can be erased by operation of the switch 21.

A block diagram of each storage section is represented in FIG. 2 for the intermediate memories 7, 7', 7". This intermediate memory, commonly available on the market, can be obtained, for example, from circuits identified as MCM-14505L, from Motorola Semiconductors, Phoenix, Ariz. The connections A0-A5 correspond to the terminals 1-4 and 11-12 of the commercial circuit and extend to the counter 10". The connection Vin corresponds to the terminal 13 and extends to the bundle of lines 6 in FIG. 1. The connection ZE1 corresponds to the terminal 6 of the commercial circuit and, as the connection E1 of FIG. 1 extends to the switch 40. The connection CE2 corresponds to the terminal 8 of the commercial circuit and extends to the counter 10' in FIG. 1. The connection VDD corresponds to the terminal 14 of the commercial circuit and extends to the power line 19 in FIG. 1. The connection Vss corresponds to the terminal 7 of the commercial circuit and extends to ground in FIG. 1. The connection Strobe corresponds to the terminal 5 of the commercial circuit and extends to the timing circuit 8 in FIG. 1 to receive clock pulses. The commercial output terminal 10 corresponds to the connection Vout and extends to the common collecting line 18 in FIG. 1, while the output terminal 9 of the commercial circuit corresponds to the read/write line which extends to the timing circuit 8 in FIG. 1. A more detailed treatment of the design and operational capabilities of the memory illustrated in FIG. 2 is not necessary in view of the data sheets which can be obtained from the manufacturer.

The circuit illustrated in FIG. 1 can, if necessary, also be separated from the code device itself. Such a separation is advantageously effected in such a way that only the operational memory 22 remains in the code device and, correspondingly, one input is provided at the device for the series code on the line 18 and for the timing pulse succession from the counter 10'. Furthermore, it is required to provide a read timing connection 9. The entire circuit portion which therefore remains separate from the code device can be separately constructed as a code adjustment device and, from application to application, can be transported from one code device to another. The physical separation is indicated by the dotted/dash broken line in FIG. 1.

The bundle of lines 6 extending from the sensing device 2 in FIG. 1 has been drawn as far as the timing circuit 8 in order to indicate a further advantageous possible embodiment. It should be pointed out that if the time position of the switching pulses on the bundle of lines 6 are compared with switching pulses above five in the timing circuit 8, simulated information bits can be excluded which might have been caused by a hole produced during transport, for example, and positioned outside of the cross sectional planes of the punched tape which is provided for the holes 3. It is furthermore possible to provide a criterion for the beginning or the end, respectively, of the information or code contents stored in the punched tape by providing that the first and last information punchings each comprise a special hole distribution or code word. Furthermore, an examination column can also be evaluated by way of the bundle of lines 6, which column is provided in the punched tape and examines the operation of all photocells or light sources, respectively. Such a test column may, for example, comprise an information punching across the punched tape and extending as far as the entire width of the punched tape.

Although we have described our invention by reference to a specific embodiment, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit for producing a pulse succession of long duration from several mutually independently produced synchronous pulse successions of shorter duration, comprising: a plurality of separate generators for producing the respective mutually independent synchronous pulse successions; a logic circuit connected to said generators for logically combining the outputs thereof to provide said pulse succession of long duration; a common information carrier storing respective pulse succession programs for each of said generators; a sensing device for serially and contemporaneously reading the respective programs from said information; means for storing the programs; means for sequentially reading the stored programs on a bit per program basis as a serial composite program; a series-parallel converter connected to said sequential reading means for converting said series composite program to parallel codes, said converter including means for storing said parallel codes; and means for reading the stored parallel codes and adjusting the operation of said plurality of generators in response thereto.

2. A circuit according to claim 1 wherein said information carrier is a punched tape and said sensing device and said punched tape are movable with respect to each other.

3. A circuit according to claim 1 wherein said means for adjusting the plurality of individual generators includes an operational memory for receiving said parallel codes, said operational memory being distributed over and assigned to individual generators.

4. A circuit according to claim 1 wherein said series-parallel converter comprises an intermediate memory.

5. A circuit according to claim 1 comprising a plurality of other series-parallel converters, and means for selectively connecting all of said series-parallel converters to said generators.

6. A circuit according to claim 1 comprising switching means connected to said serial-parallel converter and operable to erase the information stored therein.

7. A circuit according to claim 1 wherein said means for storing parallel codes has a long storage time and comprising an auxiliary power source effective to maintain power for storage upon failure of the external supply.

8. A circuit according to claim 1 wherein said sensing device and said series-parallel converter are separable as a unit from said means for reading parallel codes and said code generators and includes a parallel code output for connection to other such code reading and generating apparatus.

9. A circuit according to claim 1 comprising a timing generator having two timing inputs, said information carrier containing timing information, means for reading said timing information connected to said timing circuit causing said timing circuit to generate timing pulses for controlling reading and writing of information in said series-parallel converter.

10. A circuit according to claim 1, comprising a timing pulse input for receiving an external timing pulse connected to control reading and writing of information in said series-parallel converter.

* * * * *